United States Patent
Kang

(10) Patent No.: US 7,394,614 B2
(45) Date of Patent: Jul. 1, 2008

(54) CONTROL METHOD TO REDUCE SETTLE TMR IN HARD DISK DRIVES

(75) Inventor: Chang-Ik Kang, Fremont, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/586,964

(22) Filed: Oct. 25, 2006

(65) Prior Publication Data

US 2008/0100954 A1    May 1, 2008

(51) Int. Cl.
    *G11B 5/596* (2006.01)
(52) U.S. Cl. .................................................. 360/78.09
(58) Field of Classification Search ............ 360/78.09, 360/75, 78.06, 77.07, 77.02, 78.04, 77.06, 360/77.04; 704/216; 703/2
See application file for complete search history.

(56) References Cited

U.S. PATENT DOCUMENTS

| 6,310,742 | B1* | 10/2001 | Nazarian et al. ......... 360/77.04 |
| 6,452,735 | B1* | 9/2002 | Egan et al. ..................... 360/31 |
| 6,545,836 | B1* | 4/2003 | Ioannou et al. .......... 360/77.06 |
| 6,594,103 | B1* | 7/2003 | Despain et al. .......... 360/77.06 |
| 6,614,615 | B1* | 9/2003 | Ju et al. .................... 360/78.04 |
| 6,754,019 | B2* | 6/2004 | Tokizono et al. ............. 360/53 |
| 6,937,428 | B2* | 8/2005 | Ho et al. ................... 360/78.06 |
| 6,999,909 | B1* | 2/2006 | Subrahmanyan ............... 703/2 |
| 7,177,113 | B1* | 2/2007 | Semba et al. ............ 360/77.07 |
| 7,203,028 | B2* | 4/2007 | Chung et al. ............. 360/78.06 |
| 7,292,403 | B2* | 11/2007 | Baek et al. ............... 360/77.02 |
| 2006/0082922 | A1* | 4/2006 | Shih ......................... 360/78.06 |
| 2006/0291087 | A1* | 12/2006 | Suh et al. ................. 360/77.02 |
| 2007/0156396 | A1* | 7/2007 | Ehrlich ....................... 704/216 |
| 2007/0183076 | A1* | 8/2007 | Baugh et al. ................... 360/75 |

* cited by examiner

*Primary Examiner*—Fred Tzeng
(74) *Attorney, Agent, or Firm*—Ben J. Yorks; Irell & Manella LLP

(57) ABSTRACT

A hard disk drive with a circuit that provides a control signal to a voice coil motor to move a head across a disk of a drive. The circuit includes a state estimator that provides a plurality of state estimates and a disturbance estimator that provides a disturbance estimate that is combined with the state estimates to define the control signal. The disturbance estimator compensates for flex cable disturbances, particularly during a settle mode of a seek routine.

10 Claims, 5 Drawing Sheets

CONTROL METHOD TO REDUCE SETTLE TMR IN HARD DISK DRIVES

BACKGROUND OF THE INVENTION

1. Field of the Invention

The present invention relates to a seek routine of a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks. The heads are typically electronically connected to the circuits of the drive by a flex cable.

Information is typically stored in radial tracks that extend across the surface of each disk. Each track is typically divided into a number of segments or sectors. The voice coil motor and actuator arm can move the heads to different tracks of the disks.

FIG. 1 shows a typical track that has a number of fields associated with each sector. A sector may include an automatic gain control ("AGC") field 1 that is used to adjust the strength of the read signal, a sync field 2 to establish a timing reference for the circuits of the drive, and ID 3 and Gray Code 4 fields to provide sector and track identification.

Each sector may have also a servo field 5 located adjacent to a data field 6. The servo field 5 contains a plurality of servo bits A, B, C and D that are read and utilized in a servo routine to position the head 7 relative to the track. By way of example, the servo routine may utilize the algorithm of ((A-B)-(C-D)) to create a position error signal ("PES"). The PES is used to create a drive signal for the voice coil motor to position the head on the track.

To move the heads to a new disk location the drive performs a seek routine. In a seek routine the heads are moved across the disks and then decelerated into a settle mode. The drive controls typically include a feed forward control loop. The feed forward control loop includes a state estimator that computes head position and head velocity estimates that are used to adjust the control signal provided to the voice coil motor.

During the settle mode there may be a disturbance in the flex cable that increases the settle time of the servo process. The state estimator of the feed forward control loop includes a bias estimate. It is has been found that the bias estimate is inadequate to reduce settle time during or subsequent to a flex cable disturbance.

BRIEF SUMMARY OF THE INVENTION

A hard disk drive with a circuit that provides a control signal to a voice coil motor to move a head across a disk of a drive. The circuit includes a state estimator that provides a plurality of state estimates and a disturbance estimator that provides a disturbance estimate that is combined with the state estimates to define the control signal.

DETAILED DESCRIPTION

Described is a hard disk drive with a circuit that provides a control signal to a voice coil motor to move a head across a disk of a drive. The circuit includes a state estimator that provides a plurality of state estimates and a disturbance estimator that provides a disturbance estimate that is combined with the state estimates to define the control signal. The disturbance estimator compensates for flex cable disturbances, particularly during a settle mode of a seek routine.

Figure 2:
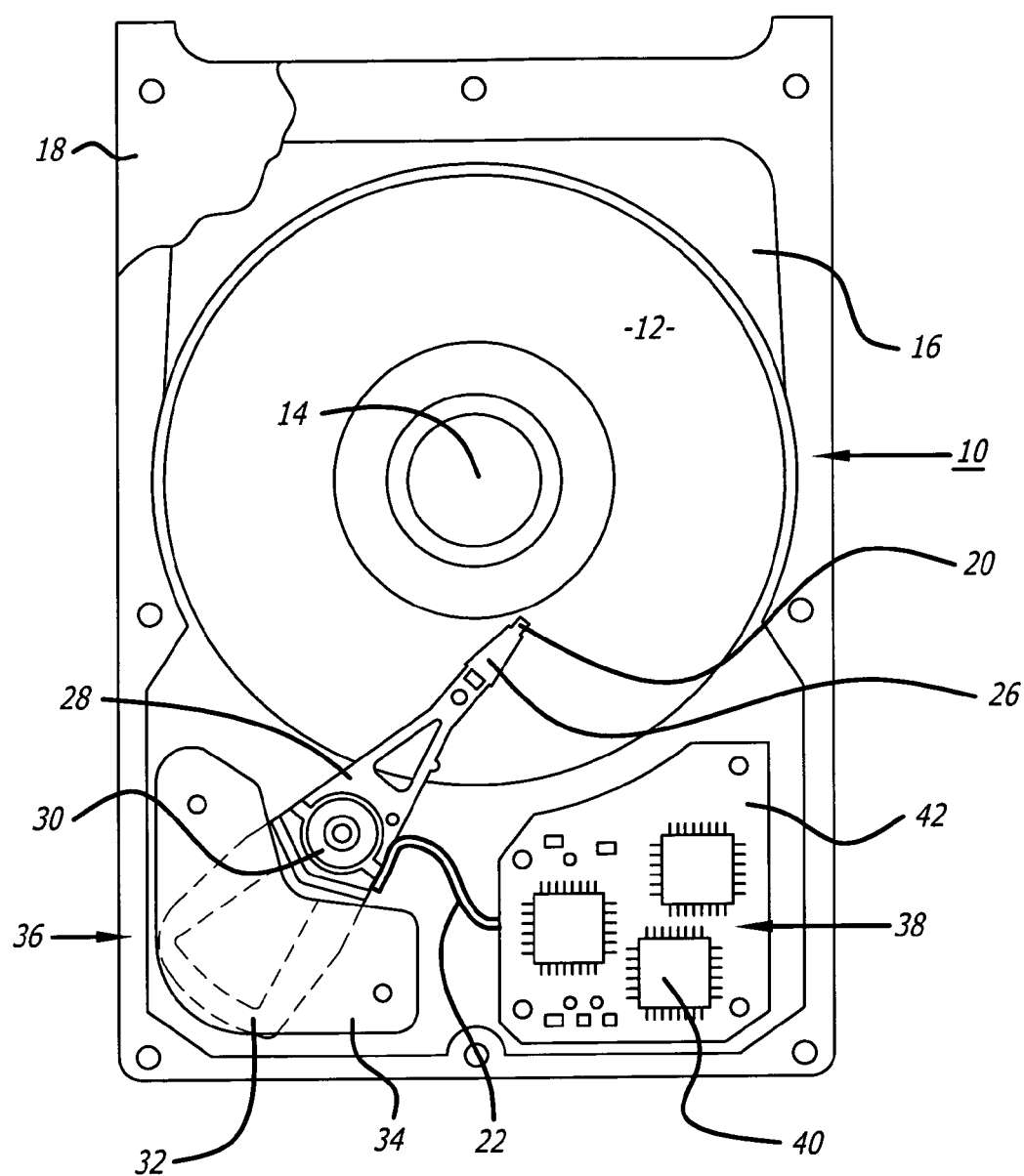
FIG. 2 is a top view of an embodiment of a hard disk drive.

Referring to the drawings more particularly by reference numbers, FIG. 2 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. The heads 20 may have separate write and read elements. The write element magnetizes the disk 12 to write data. The read element senses the magnetic fields of the disks 12 to read data. By way of example, the read element may be constructed from a magneto-resistive material that has a resistance which varies linearly with changes in magnetic flux. Each head is connected to a flex circuit 22. The flex circuit 22 provides an electrical connection between the head 20 and the electrical circuits of the drives.

Each head 20 may be gimbal mounted to a suspension arm 26 as part of a head gimbal assembly (HGA). The suspension arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes one or more integrated circuits 40 coupled to a printed circuit board 42. The printed circuit board 40 is coupled to the voice coil 32, heads 20 and spindle motor 14 by wires (not shown).

Figure 3:
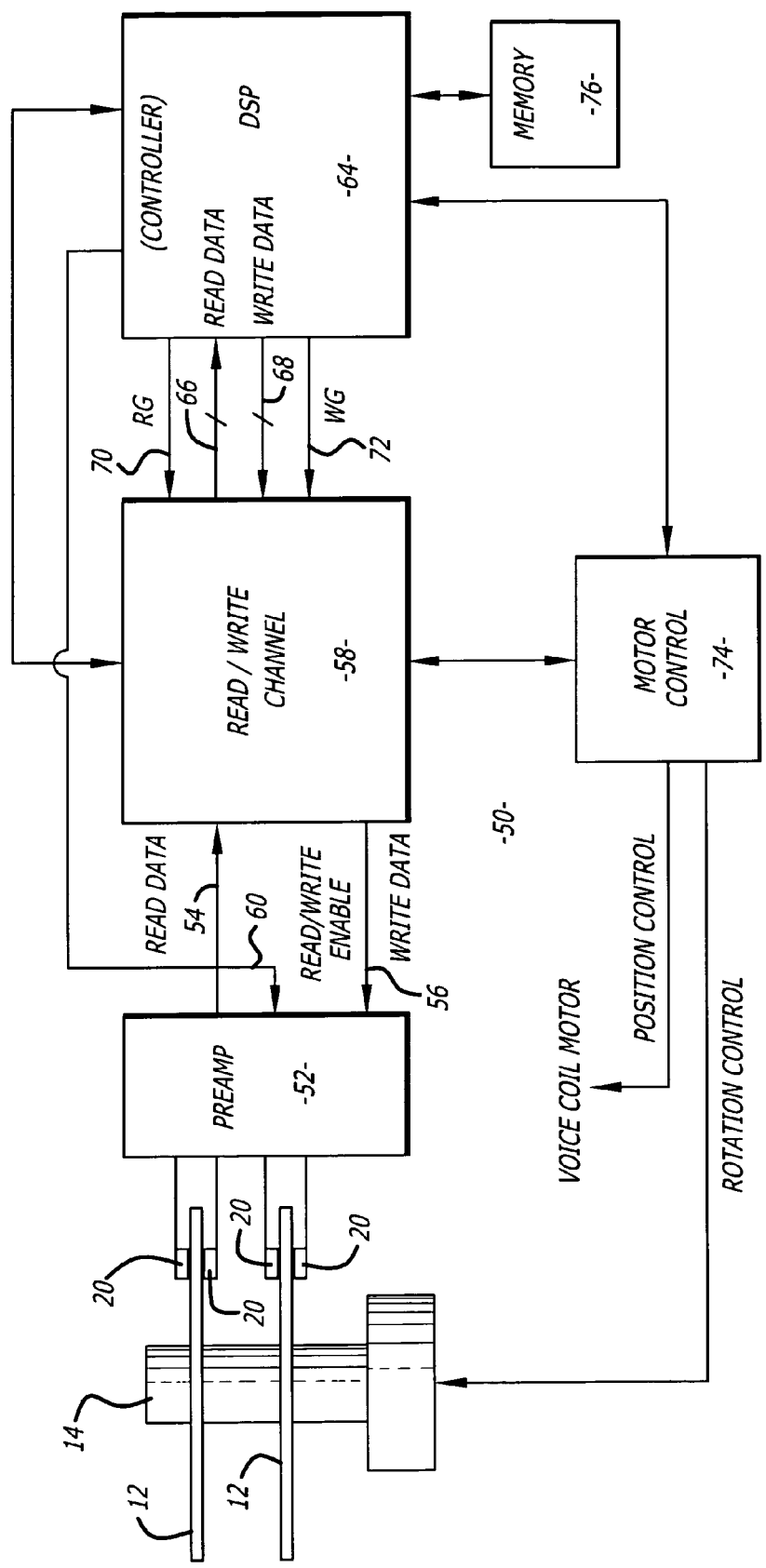
FIG. 3 is a schematic of an electrical circuit for the hard disk drive.

FIG. 3 shows an electrical circuit 50 for reading and writing data onto the disks 12. The circuit 50 may include a preamplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is enabled when writing data to the disks 12. The controller 64 may be a digital signal processor that operates in accordance with a software routine, including a routine(s) to write and read data from the disks 12. The read/write channel circuit 58 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM") that contains instructions that are read by the controller 64.

Figure 1:
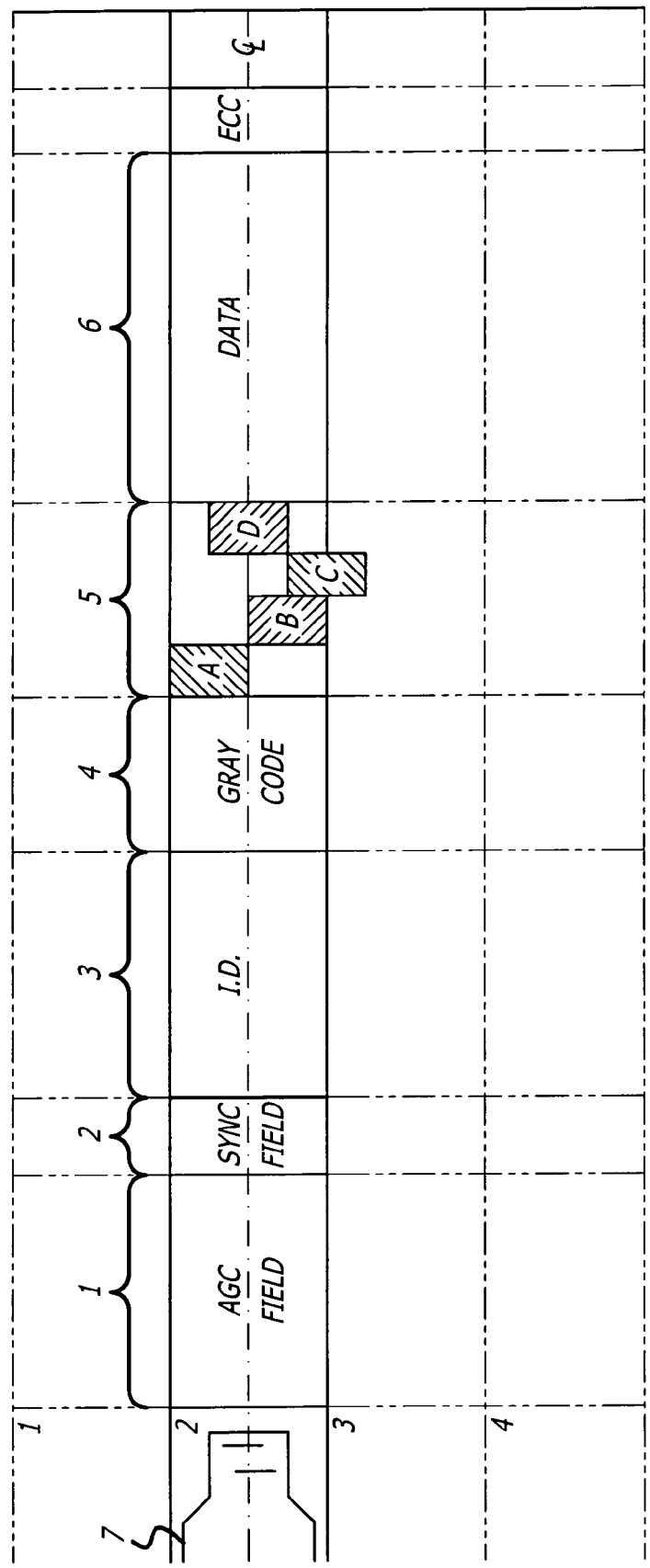
FIG. 1 is an illustration of a track of the prior art.

Each sector of a disk track typically has servo bits A, B, C and D as shown in FIG. 1. The controller 64 may operate a servo routine utilizing the servo bits to position the head relative to the track. The head is moved in accordance with a position error signal ("PES"). The PES reflects the difference between a target position and the actual position of the head.

Figure 4:
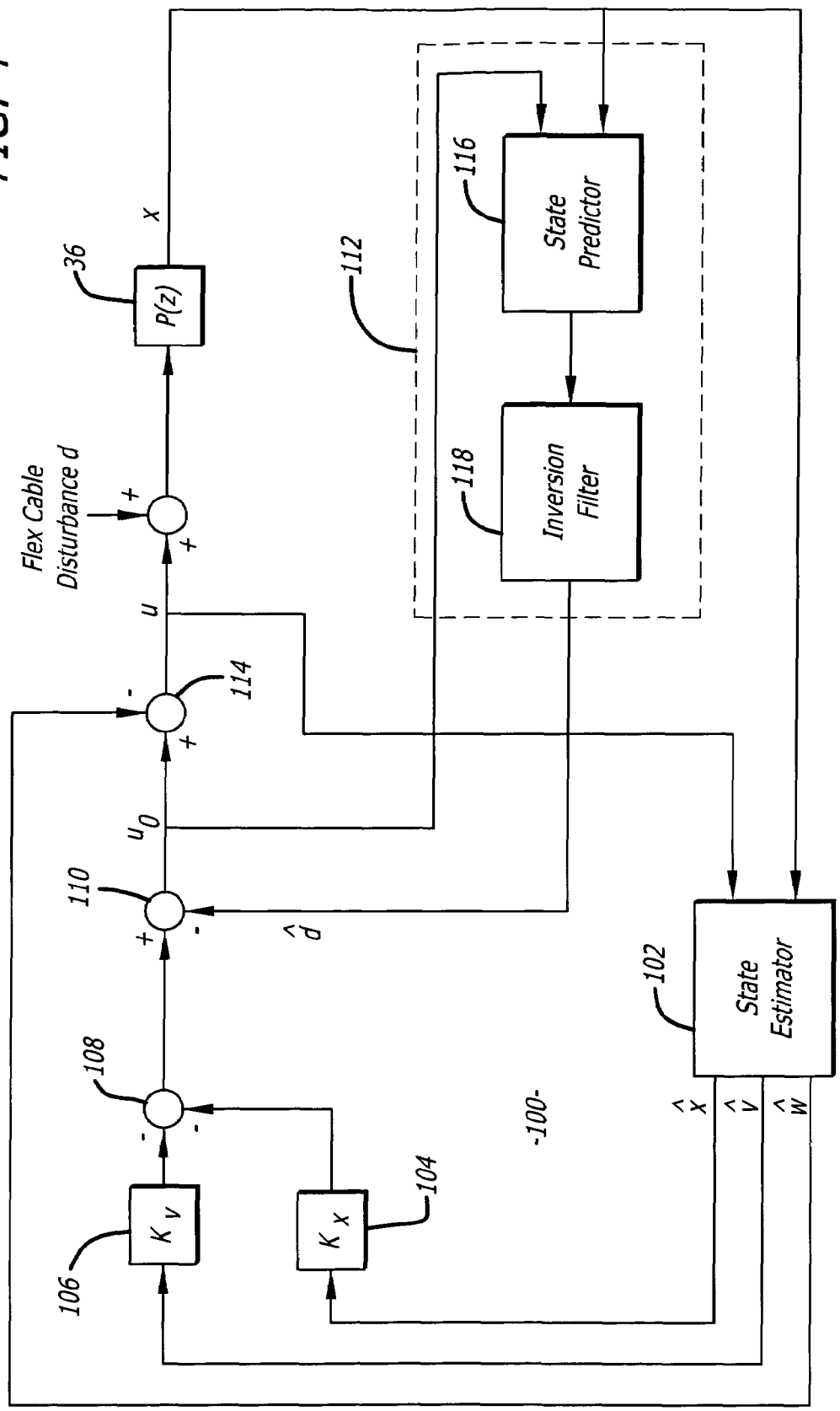
FIG. 4 is a schematic of a servo for the hard disk drive.

FIG. 4 shows a schematic of a servo system 100 used to perform a seek operation. The servo is typically performed by the controller 64. In a seek operation the heads are moved from one track location to another track location. The servo system 100 can be particularly implemented during a settle mode of a servo routine.

The system 100 may include a state estimator 102 that generates predicted estimators $\hat{x}$, $\hat{v}$ and $\hat{w}$. Estimator $\hat{x}$ corresponds to a predicted head position and estimator $\hat{v}$ corresponds to a predicted head velocity. $\hat{W}$ is a bias estimate. The state estimator receives as input a control signal u and a head position x.

The head position estimate $\hat{x}$ and head velocity estimate $\hat{v}$ are multiplied in corresponding blocks 104 and 106 by position $K_x$ and velocity $K_v$ gains, respectively. The results are combined by an adder 108. The output of adder 108 is provided to adder 110. The output of adder 110 is combined with the bias estimate $\hat{w}$ to create a control signal u. The control signal u is provided to the voice coil motor to move the heads of the drive. The flex circuit may introduce a disturbance d that varies the control signal.

The servo system 100 includes a disturbance estimator 112. The disturbance estimator 112 receives as input, an intermediate control signal $u_0$ and the head position x, and computes a disturbance estimate $\hat{d}$. The following describes a design for an embodiment of the disturbance estimator 112. The disturbance estimate $\hat{d}$ is combined by adder 110 with the combined head position $\hat{x}$ and head velocity $\hat{v}$ estimates. The output of adder 110 is combined with the bias estimate $\hat{w}$ by adder 116 to create the control signal u. The disturbance estimator 112 may include a state predictor 114 and an inversion filter 118.

Neglecting the high-frequency flexible modes, we have the following dynamic model of the VCM actuator:

$$\overset{00}{x} - \overset{0}{v} = K_a(u+D) \qquad (1)$$

$K_a$ is an acceleration constant of the voice coil motor. The variables x and v represent head position and head velocity, respectively. There is an initial position x(0) and an initial velocity v(0) before the seek system completely settles. The discrete equivalent to the continuous-time system can be defined by the following equations:

$$x(n+1)=A_p x(n)+B_p u(n)+B_p d(n) \qquad (2)$$

$$x(n)=C_p x(n) \qquad (3)$$

The state vector x, system matrix A, column vectors B, row vector C can be defined as follows:

$$x(n) = \begin{bmatrix} x(n) \\ v(n) \\ u(n-1)+d(n-1) \end{bmatrix} \qquad (4)$$

-continued $$A_p = \begin{bmatrix} 1 & T_s & K_a(T_s-T_d)^2/2 \\ 0 & 1 & K_a(T_s-T_d) \\ 0 & 0 & 0 \end{bmatrix}$$

$$B_p = \begin{bmatrix} K_a(2T_s-T_d)T_d/2 \\ K_a T_d \\ 1 \end{bmatrix} \quad C_p = \begin{bmatrix} 1 \\ 0 \\ 0 \end{bmatrix}^T$$

The constants $T_s$ and $T_d$ are a sampling period and a control delay, respectively.

A control law for addressing flex cable disturbances can be expressed as:

$$u(n)=-k_x \hat{x}(n)-k_v \hat{v}(n)-\hat{w}(n)-\hat{d}(n) \qquad (5)$$

The state predictor 116 can be designed by excluding the bias estimate w(n) from the control input u(n) to define an intermediate control input $u_0(n)$:

$$u_0(n)=u(n)+\hat{w}(n)=-k_x \hat{x}(n)-k_v \hat{v}(n)-\hat{d}(n) \qquad (6)$$

The exclusion of bias estimate is to ensure that the disturbance estimator is decoupled dynamically from bias estimate $\hat{w}(n)$. The state predictor can predict head position from the intermediate control input $u_0(n)$ and the measured position x(n) with the following equations:

$$\bar{x}(n+1)=A_p \hat{x}(n)+B_p u(n) \qquad (7)$$

$$\hat{x}(n)=\bar{x}(n)+L_p[x(n)-C_p \bar{x}(n)] \qquad (8)$$

Here $\bar{x}$ is the prediction vector and $\hat{x}$ is a temporary vector required for implementation. Vector $L_p$ is a feedback gain vector. The unknown flex cable disturbance can be estimated from a prediction error. Combining equations (7) and (8) together and using (2) produces:

$$\bar{x}(n+1)=A_p \bar{x}(n)+B_p u(n)+A_p L_p C_p[x(n)-\bar{x}(n)] \qquad (9)$$

Defining prediction error vector as $$\overset{0}{x}(n) = x(n) - \bar{x}(n)$$

and subtracting equation (9) from (2) provides prediction error dynamics:

$$\overset{0}{x}(n+1)=(A_p-A_p L_p C_p)\overset{0}{x}(n)+B_p d(n) \qquad (10)$$

In practice, there could be some initial prediction error $\overset{0}{x}(0)=x(0)-\bar{x}(0)$ because voice coil motor may have an initial position x(0) and an initial velocity v(0). Taking the Z-transform of equation (10) and then solving for position prediction error $\overset{0}{x}(n)=C_p \overset{0}{x}(n)$ yields:

$$\overset{0}{x}(z)=C_p[zI-(A_p-A_p L_p C_p)]^{-1}\overset{0}{x}(0)+C_p [zI-(A_p-A_p L_p C_p)]^{-1}B_p d(z) \qquad (10)$$

If the predictor state is initialized as $\bar{x}(0)=\hat{x}(0)$ by reading initial estimate $\hat{x}(0)$ from state estimator, the position prediction error due to an initial prediction vector error will become negligible. The state initializer in FIG. 4 initializes the predictor state to eliminate the effect of the voice coil motor initial condition on position prediction error. With initialization of the state predictor, the transfer function from disturbance d to position prediction error $\overset{0}{x}(n)=C_p \overset{0}{x}(n)$ is:

$$H_{d2pe}(z) = \frac{\hat{\%o}(z)}{\hat{d}(z)} = C_p[zI - (A_p - A_p L_p C_p)]^{-1} B_p \quad (11)$$

The estimation of the flex cable disturbance from position prediction error $\hat{\%o}(z)$ requires the inversion of $H_{d2pe}(z)$.

$$\hat{d}(z) = \frac{1}{H_{d2pe}(z)} \hat{\%o}(z) \quad (12)$$

The system $H_{d2pe}(z)$ is a non-minimum phase system (has unstable zero) because the voice coil motor $C_p[zI-A_p]^{-1}B_p$ is a third-order non-minimum phase system due to the effect of control delay. In addition, the system $H_{d2pe}(z)$ is a proper system. For example, $$H_{d2pe}(z) = \frac{C_p \mathrm{adj}(zI - A_p) B_p}{\det(zI - A_p + A_p L_p C_p)} \quad (13)$$

$$= \frac{K_0(z - \beta_{stable})(z - \beta_{unstable})}{z^3 + \alpha_1 z^2 + \alpha_2 z + \alpha_3}$$

where $|\beta_{stable}|<1<|\beta_{unstable}|$. The direct inversion $1/H_{d2pe}(z)$ is unstable and unrealizable. In order to find a stable and realizable inverse, the non-minimum phase system $H_{d2pe}(z)$ is decomposed into a minimum phase system and an all pass system.

$$H_{d2pe}(z) = H_{min}(z) H_{allpass}(z) \quad (14)$$

$$H_{min}(z) = \frac{-\beta_{unstable} K_0 (z - \beta_{stable})\left(z - \frac{1}{\beta_{unstable}}\right)}{z^3 + \alpha_1 z^2 + \alpha_2 z + \alpha_3}$$

$$H_{allpass}(z) = \frac{-(z - \beta_{unstable})}{\beta_{unstable}\left(z - \frac{1}{\beta_{unstable}}\right)}$$

Only a minimum phase system of two systems is inversed to create a stable inversion filter and add first-order proper low pass filter after inversion to make it realizable and to prevent high frequency boosting that may arise due to system inversion.

$$H_{inv}(z) = \frac{1}{H_{min}(z)} \frac{1-a}{z-a} \quad (15)$$

$$= \frac{(1-a)(z^3 + \alpha_1 z^2 + \alpha_2 z + \alpha_3)}{-\beta_{unstable} K_0 (z - \beta_{stable})\left(z - \frac{1}{\beta_{unstable}}\right)(z-a)}$$

The disturbance estimate is determined by passing the prediction error through the inversion filter.

$$\hat{d}(z) = H_{inv}(z) \hat{\%o}(z) \quad (16)$$

Figure 5:
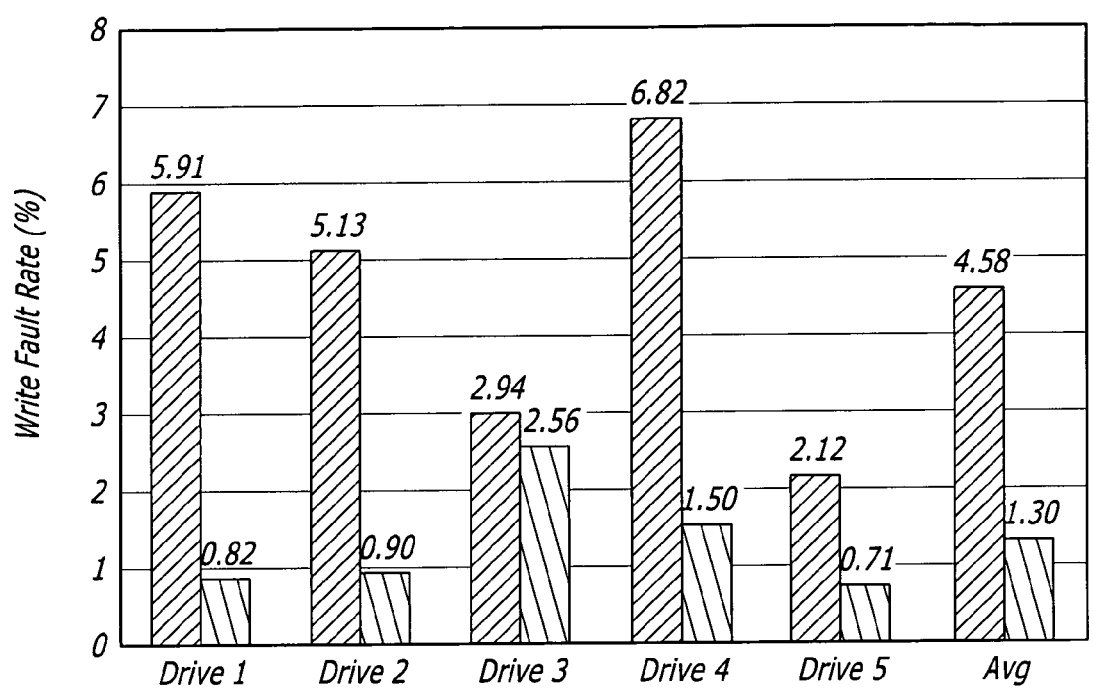
FIG. 5 is a graph showing write fault rates between drives of the prior art and drives operating with a disturbance estimator.

FIG. 5 shows a comparison between disk drives operating with a disturbance estimator and the same drives operating without a disturbance estimator. As can be seen drives with the disturbance estimator created less write faults than drives without the estimator.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
   a disk;
   a head coupled to said disk;
   a flex circuit coupled to said head;
   an actuator arm coupled to said head;
   a voice coil motor coupled to said actuator arm; and,
   a circuit that provides a control signal to said voice coil motor to move said head across said disk, said circuit includes a state estimator that provides a plurality of state estimates and a flex circuit disturbance estimator that provides a flex circuit disturbance estimate that is combined with said state estimates to create said control signal.

2. The hard disk drive of claim 1, wherein said flex circuit disturbance estimator includes a state predictor and an inversion filter.

3. The hard disk drive of claim 1, wherein said flex circuit disturbance estimate is computed from a head position estimate and a head velocity estimate.

4. The hard disk drive of claim 1, wherein said circuit includes a controller.

5. The hard disk drive of claim 1, wherein said flex circuit disturbance estimate is computed from a head position estimate and a head velocity estimate.

6. The hard disk drive of claim 1, wherein said circuit means includes a controller.

7. A hard disk drive, comprising:
   a disk;
   a head coupled to said disk;
   a flex circuit coupled to said head;
   an actuator arm coupled to said head;
   a voice coil motor coupled to said actuator arm; and,
   circuit means for providing a control signal to said voice coil motor to move said head across said disk, said circuit means includes a state estimator that provides a plurality of state estimates and a flex circuit disturbance estimator that provides a flex circuit disturbance estimate that is combined with said state estimates to create said control signal.

8. The hard disk drive of claim 6, wherein said flex circuit disturbance estimator includes a state predictor and an inversion filter.

9. A method for moving a head across a disk in a hard disk drive, comprising:
   computing a plurality of state estimates;
   computing a flex circuit disturbance estimate;
   combining the states estimates and the flex circuit disturbance estimate to generate a control signal; and,
   providing the control signal to a voice coil motor to move a head relative to a disk.

10. The method of claim 9, wherein the flex circuit disturbance estimate is computed from a head position estimate and a head velocity estimate.

* * * * *